United States Patent [19]

Krishnan et al.

[11] Patent Number: 5,405,892
[45] Date of Patent: Apr. 11, 1995

[54] MELT-STABLE, PIGMENTED POLYCARBONATE COMPOSITION

[75] Inventors: Sivaram Krishnan, Pittsburgh; James B. Johnson, Washington, both of Pa.; Susan H. Bates, Heath; Edward M. Anderson, Newark, both of Ohio

[73] Assignee: Miles Inc., Pittsburgh, Pa.

[21] Appl. No.: 263,702

[22] Filed: Jun. 22, 1994

[51] Int. Cl.$^6$ .................................................. C08K 5/15
[52] U.S. Cl. ........................ 524/114; 524/88; 524/89; 524/90; 524/109; 524/401; 524/407; 524/420; 524/424; 524/427; 524/435
[58] Field of Search ............... 524/88, 89, 90, 401, 524/407, 420, 424, 427, 435, 109, 114

[56] References Cited

U.S. PATENT DOCUMENTS

| | | | |
|---|---|---|---|
| 3,761,440 | 9/1973 | Margotte et al. | 260/37 PC |
| 4,393,158 | 7/1983 | Miller | 524/114 |
| 4,397,973 | 8/1983 | Scott et al. | 524/114 |
| 4,400,482 | 8/1983 | Close | 524/114 |
| 4,522,966 | 6/1985 | Funaki et al. | 524/114 |
| 4,722,955 | 2/1988 | Dick | 524/114 |

FOREIGN PATENT DOCUMENTS 567079  10/1993  European Pat. Off. ........... 524/114

*Primary Examiner*—Kriellion S. Morgan
*Attorney, Agent, or Firm*—Joseph C. Gil; Aron Preis

[57] ABSTRACT

A melt-stable, pigmented thermoplastic molding composition is disclosed. Accordingly, to the composition which contains polycarbonate resin and pigment there is imparted an improved level of melt stability upon the incorporation therewith of an additive amount of a melt stabilizer conforming to

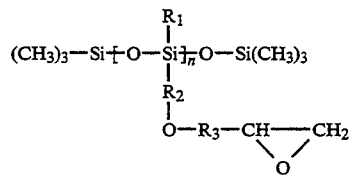

where $R_1$, $R_2$, $R_3$ and n are defined. In an additional embodiment the invention relates to a color concentrate containing polycarbonate resin, up to 30% of a pigment and an effective amount of said stabilizer.

19 Claims, No Drawings

MELT-STABLE, PIGMENTED POLYCARBONATE COMPOSITION

FIELD OF THE INVENTION

The invention relates to thermoplastic molding compositions and more particularly, to stabilized compositions which contain polycarbonate resin and pigment.

SUMMARY OF THE INVENTION

A melt-stable, pigmented thermoplastic molding composition is disclosed. Accordingly, the composition which contains polycarbonate resin and pigment is imparted an improved level of melt stability upon the incorporation therewith of an additive amount of a melt stabilizer conforming to

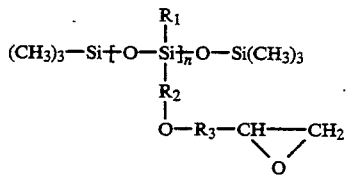

where $R_1$, $R_2$, $R_3$ and n are defined. In an additional embodiment, the invention relates to a color concentrate containing polycarbonate resin, up to 30% of a pigment and an effective amount of said stabilizer.

BACKGROUND OF THE INVENTION

Thermoplastic polycarbonate resins and their usefulness for the preparation of molded articles are known in the art. Also known are compositions which contain polycarbonate resins and pigments such as inorganic oxides, sulfides and salts. These are useful in applications where opaque or translucent articles are desired. It has been the observation of those skilled in the art that pigmentation of polycarbonates is often associated with degradation of the polycarbonate resin, a degradation in terms of lowered molecular weight which is expressed, for instance, as a lowered level of mechanical properties often also in terms of increased melt flow. In this connection, the relevant art is noted to include U.S. Pat. No. 3,761,440 which addresses the problem by incorporating in the pigmented polycarbonate composition a polymer of olefinically unsaturated monomers containing nitrile and/or ester groups.

DETAILED DESCRIPTION OF THE INVENTION

Aromatic polycarbonates within the scope of the present invention are homopolycarbonates and copolycarbonates and mixtures thereof.

The polycarbonates generally have a weight average molecular weight of 10,000–200,000, preferably 20,000–80,000 and their melt flow rate, per ASTM D-1238 at 300° C., is about 1 to about 65 g/10 min., preferably about 2–15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y. 1964, all incorporated herein by reference).

In the present context, dihydroxy compounds suitable for the preparation of the polycarbonates of the invention conform to the structural formulae (1) or (2).

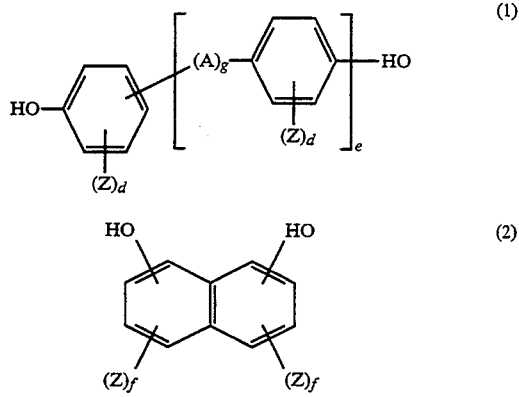

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

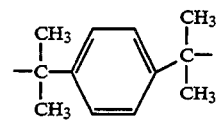

e and g both denote the number 0 to 1; Z denotes F, Cl, Br or $C_1$-$C_4$—alkyl and if several Z radicals are substituents in one aryl radical, they may be identical or different from one another;
d denotes an integer of from 0 to 4; and
denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α, α-bis-(hydroxyphenyl)-diisopropylbenzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,84, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)- cyclohexane, α,α'-bis-(3,5-dimethyl-4-hydroxyphenyl)-p-diisopropyl-benzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and trimethyl cyclohexane diphenol.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compounds.

Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxphenyl)-benzene; 1,1,1-tri(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxy-triphenylmethyl-benzene. Some of the other polyfunctional compounds are 2,4-dihydroxybenzoic acid, trimesic acid, cyanuric chloride and 3,3-bis-(4-hydroxyphenyl)2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5–24, 13–16, 7.5–13.0 and 3.5–6.5 g/10 min., respectively. These are products of Miles Inc. of Pittsburgh, Pa.

A polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated herein by reference.

The pigments useful in the present context are both organic and inorganic and are known. Among the organic pigments, mention may be made of azo compounds, anthraquinone, phthalocyanine, quinacridone, isoindolenenone, perilene, quinonaphthalone and perinone pigments. The inorganic pigments include oxides such as titanium dioxide, iron oxide, zinc oxide and chromium-(III)-oxide, sulfides, such as zinc sulfides and cadmium sulfides and salts such as barium sulphate, cadmium selenide, ultramarine and nickel chromium titanate. Also suitable as pigments in the present context are carbonates, such as calcium carbonate, barium carbonate, and carbon black. These pigments are incorporated in the composition of the invention in an amount of 0.1 to 30% relative to the weight of the composition. The embodiment of the present invention relating to a thermoplastic molding composition entails an amount of pigment which is about 0.1 to 5%, preferably about 0.1 to 3% relative to the total weight of the resin and pigment. In the embodiment relating to a color concentrate, the amount of pigment is about 5 to 30%, preferably 10 to 20% relative to the weight of the total weight of the resin and pigment. The stabilizer in accordance with the invention conforms to

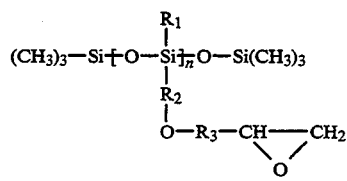

where
$R_1$ is $C_{1-4}$ alkyl or $C_{6-14}$ aryl,
$R_2$ denotes $(CH_2)_m$ where m is an integer of 1 to 4, and
$R_3$ is $(CH_2)_p$ where p is 1 to 4 and
n is about 1 to 30, preferably 2 to 25.

In the preferred embodiment, the stabilizer of the invention is characterized in that $R_1$ is methyl, $R_2$ denotes $(CH_2)_3$ and $R_3$ is $CH_2$ and n is about 7–11.

The stabilizer of the invention is added to the composition in an amount of about 0.5 to 20 percent, preferably 1 to 10% relative to the weight of the pigment.

The preparation of melt stable thermoplastic molding compositions in accordance with the invention and the preparation of color concentrates are conventional.

The invention is further illustrated but is not intended to be limited by the following examples in which all parts and percentages are by weight unless otherwise specified.

EXAMPLES

Experimental

Melt stable molding compositions in accordance with the invention have been prepared and their properties determined as noted below. In preparing the compositions, conventional processing was followed. The pigment used in the preparation of the compositions described below was titanium dioxide and the melt stabilizer was polysiloxane conforming to

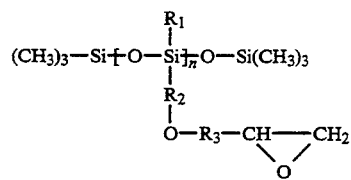

In Table 1, there are summarized the results of testing the melt flow indices of compositions containing pigment alone and compositions stabilized in accordance with the invention. The determination of melt flow was in accordance with ASTM D 1238.

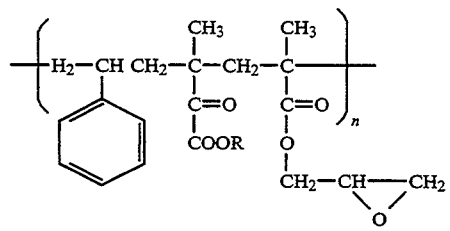

$n = 20-30$

"B" represents a polysiloxane thermal stabilizer which contains propyl glycidyl ether structural units in its backbone.

TABLE 1

Melt Stabilization of Higher Molecular Weight Polycarbonate Containing Titanium Dioxide
Polycarbonate Pellets MFR[1], 6.95 g/10 min.

|  | W/O Additive and TiO$_2$ | 1% TiO$_2$ | 1% TiO$_2$ + 0.1% Additive | 2% TiO$_2$ | 2% TiO$_2$ + 0.2% Additive | 3% TiO$_2$ | 3% TiO$_2$ + 0.3% Additive |
|---|---|---|---|---|---|---|---|
| Compounded Pellets MFR, g/10 min. | 6.9 | 9.4 | 6.9 | 13.1 | 6.8 | 15.3 | 6.8 |
| Molded Parts at 550° F. MFR g/10 min. | 7.2 | 9.4 | 7.2 | 13.3 | 7.2 | 16.1 | 7.4 |
| Molded Parts at 600° F. MFR, g/10 min | 7.2 | 10.2 | 7.8 | 15.3 | 7.9 | 21.7 | 8.3 |
| Molded Parts at 650° F. MFR, g/10 min. | 7.3 | 12.7 | 7.4 | 17.4 | 7.5 | 27.3 | 7.9 |
| ΔMFR Pellets to 650° F. Molding | 0.4 | 5.7 | 0.5 | 10.4 | 0.5 | 20.3 | 0.9 |
| ΔMFR Compounded Pellets | 0.4 | 3.2 | 0.5 | 4.3 | 0.6 | 12.0 | 1.1 |
| Brightness[2] (% increase) |  | 80.4(0) | 86.3 (7.4%) |  |  |  |  |

[1] Per ASTM D 1238 Condition 300° C./1.2 kg.
[2] Tristimulus Values: Y, Illuminant C, 2° observer per ASTM E 308.

The results reported in Table 2 refer to the testing of compositions where the initial melt flow of the resin was 22.3 g/10 min.

TABLE 2

Melt Stabilization of Lower Molecular Weight Polycarbonate Containing Titanium Dioxide
Polycarbonate Pellets MFR[1], 22.3 g/10 min.

|  | W/O Additive and TiO$_2$ | 1% TiO$_2$ | 1% TiO$_2$ + 0.1% Additive | 2% TiO$_2$ | 2% TiO$_2$ + 0.2% Additive | 3% TiO$_2$ | 3% TiO$_2$ + 0.3% Additive |
|---|---|---|---|---|---|---|---|
| Compounded Pellets MFR, g/10 min. | 22.3 | 27.2 | 22.6 | 30.4 | 22.8 | 35.5 | 22.0 |
| MoWed Parts at 550° F. MFR, g/10 min. | 22.9 | 26.8 | 22.4 | 30.7 | 22.5 | 36.8 | 22.7 |
| Molded Parts at 600° F. MFR, g/10 min. | 22.8 | 27.0 | 22.6 | 33.7 | 22.1 | 37.8 | 22.6 |
| Molded Parts at 650° F. MFR, g/10 min. | 23.9 | 30.8 | 22.9 | 34.2 | 23.1 | 51.7 | 23.2 |
| ΔMFR Pellets to 660° F. Molding | 1.6 | 8.5 | 0.6 | 11.9 | 0.8 | 29.4 | 0.9 |
| ΔMFR Compounded Pellets to 650° F. Molding | 1.6 | 3.6 | 0.3 | 3.8 | 0.3 | 16.2 | 1.3 |
| Btightness[2] (% increase) |  | 82.8(0) | 87.8 (6.1%) |  |  |  |  |

[1] Per ASTM D 1238 Condition 300° C./1.2 kg
[2] Tristimulus Values: Y, Illuminant C, 2° observer per ASTM E 308.

Tables 3 and 4 below represent a summary of the results of evaluation of compositions which were differently stabilized. In the table "M" represents a prior art melt stabilizer (in accordance with U.S. Pat. No. 3,761,440) which is a terpolymer based on styrene, methyl-methacrylate and glycidyl methacrylate conforming structurally to

TABLE 3

Melt Stabilization of Higher Molecular Weight Polycarbonate Containing Titanium Dioxide (values are MFR in g/10 min.)
Polycarbonate Pellets, MFR[1], 6.9 g/10 min.

|  | no additive | 3% TiO$_2$ | 3% TiO$_2$ + 0.3% TiO + 0.3%" "M" | +0.3% TiO + 0.3%" "B" |
|---|---|---|---|---|
| compounded pellets | 6.9 | 13.4 | 8.3 | 6.8 |
| molded parts, @ 550° F. | 7.6 | 18.9 | 8.0 | 7.4 |

TABLE 3-continued

Melt Stabilization of Higher Molecular Weight Polycarbonate Containing Titanium Dioxide (values are MFR in g/10 min.)
Polycarbonate Pellets, MFR$^1$, 6.9 g/10 min.

|  | no additive | 3% TiO$_2$ | 3% TiO$_2$ + 0.3% "M" | +0.3% TiO + 0.3% "B" |
|---|---|---|---|---|
| molded parts, @ 600° F. | 7.9 | 19.1 | 8.7 | 8.3 |
| molded parts, @ 650° F. | 7.5 | 17.7 | 8.9 | 7.9 |
| ΔMFR$^a$ | 0.6 | 10.8 | 2.0 | 0.9 |
| ΔMFR$^b$ | 0.6 | 4.3 | 0.6 | 1.1 |

$^a$pellets to 650° F. molding
$^b$compounded pellets to 650° F. molding

TABLE 4

Melt Stabilization of lower Molecular Weight Polycarbonate Containing Titanium Dioxide (values are MFR in g/10 min.)
Polycarbonate Pellets, MFR$^1$, 22.3 g/10 min.

|  | no additive | 3% TiO$_2$ | 3% TiO$_2$ + 0.3%"" M" | 3% TiO$_2$ + 0.3%" "B" |
|---|---|---|---|---|
| compounded pellets | 22.3 | 36.2 | 25.7 | 21.9 |
| molded parts, @ 550° F. | 22.6 | 38.5 | 25.3 | 22.7 |
| molded parts, @ 600° F. | 23.4 | 55.0 | 25.3 | 22.6 |
| molded parts, @650° F. | 22.9 | 53.3 | 25.6 | 23.2 |
| Δ MFR$^a$ | 0.3 | 31.0 | 3.3 | 0.9 |
| Δ MFR$^b$ | 0.5 | 17.1 | 0.1 | 1.3 |

$^a$pellets to 650° F. molding
$^b$compounded pellets to 650° F. molding

Clearly the differences in melt flow rates of the compositions representative of the invention are smaller than the corresponding values of compositions which are outside the scope of the invention. The values are indicative of the greater melt stability of the inventive compositions.

Table 5 summarizes the results of testing of color concentrates. The resin used in preparing the concentrates was a bisphenol-A homopolycarbonate having a melt flow index of 17.0 g/10 min. The amount of pigment (titanium dioxide) is noted as are the melt flow rates (MFR) of the color concentrates. In the compositions there are included stabilizers as follows: Composition A contains 1.1% by weight of 3,4-epoxy cyclohexylmethyl-3',4'-epoxy cyclohexyl carboxylate, a known stabilizer; Composition B contains 1.1% by weight of "M" which was described above; composition C contains 1.1% by weight of "B"; Composition D contains 0.55% of "B" and composition E contains no stabilizers.

TABLE 5

Highly Loaded Titanium Dioxide (11%)
Polycarbonate Pellets 17.0 g/10 min.

|  | A | B | C | D | E |
|---|---|---|---|---|---|
| MFR Compounded Pellets | 33.5 | 14.6 | 13.4 | 13.7 | 60.5 |
| MFR of Molding |  |  |  |  |  |
| 550° F. | 35.3 | 15.8 | 13.8 | 15.1 | 61.2 |
| 600° F. | 54.1 | 15.8 | 15.0 | 15.4 | 70.3 |
| 650° F. | 49.5 | 16.9 | 14.6 | 15.8 | 101.9 |
| ΔMFR Pellet to 650° F. Molding | 32.5 | −0.1 | −2.4 | −1.2 | 84.9 |
| ΔMFR Compounded Pellet to 650° F. Molding | 16.0 | 2.3 | 1.2 | 2.1 | 41.1 |

Clearly, the inventive composition and concentrate described above exhibit a degree of melt stability which is not shared by the unstabilized counterparts, nor by the corresponding compositions which are otherwise stabilized.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A molding composition characterized by improved thermal stability comprising (i) a polycarbonate resin (ii) a pigment and (iii) an additive amount of a melt stabilizer conforming to

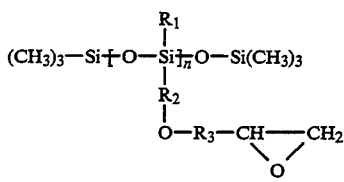

where
R$_1$ is C$_{1-4}$ alkyl or C$_{6-14}$ aryl, R$_2$ denotes (CH$_2$)$_m$ where m is an integer of 1 to 4,
R$_3$ is (CH$_2$)$_p$ where p is 1 to 4 and
n is about 1 to 30.

2. The composition of claim 1 wherein R$_1$ is methyl R$_2$ denotes (CH$_2$)$_3$, R$_3$ is CH$_2$ and n is about 7–11.

3. The composition of claim 1 wherein said stabilizer is present in the composition in an amount of about 0.5 to 20 percent relative to the weight of the pigment.

4. The composition of claim 1 wherein said stabilizer is present in the composition in an amount of about 1 to 10% percent relative to the weight of the pigment.

5. The composition of claim 1 wherein said pigment is present in an amount of about 5 to 30 % relative to the total weight of resin and pigment.

6. The composition of claim 1 wherein said pigment is present in an amount of about 10 to 20 % relative to the total weight of resin and pigment.

7. The composition of claim 1 wherein said pigment is present in an amount of about 0.1 to 5% relative to the total weight of resin and pigment.

8. The composition of claim 1 wherein said pigment is present in an amount of about 0.1 to 3% relative to the total weight of resin and pigment.

9. The composition of claim 1 wherein said pigment is a member selected from the group consisting of organic and inorganic pigments.

10. The composition of claim 9 wherein said organic pigment is a member selected from the group consisting of azo compounds, anthraquinone, phthalocyanine, quinacridone, isoindolenenone, perilene, quinonaphthalone and perinone.

11. The composition of claim 9 wherein said inorganic pigment is a member selected from the group consisting of oxides, sulfides and salts.

12. The composition of claim 11 wherein said oxide is a member selected from the group consisting of titanium dioxide, iron oxide and chromium-(III)-oxide.

13. The composition of claim 11 wherein said sulfide is a member selected from the group consisting of zinc sulfides and cadmium sulfides.

14. The composition of claim 11 wherein said salt is a member selected from the group consisting of cadmium selenide and calcium carbonate.

15. The composition of claim 1 wherein said pigment is carbon black.

16. The composition of claim 1 wherein said n is 2 to 25.

17. The composition of claim 1 wherein said polycarbonate resin is branched.

18. The composition of claim 1 wherein said polycarbonate is a homopolycarbonate derived from bisphenol-A.

19. The composition of claim 1 wherein said polycarbonate is a copolycarbonate.

* * * * *